United States Patent [19]

Bees

[11] Patent Number: 4,506,196
[45] Date of Patent: Mar. 19, 1985

[54] SERIES INVERTER FOR CAPACITOR CHARGING

[75] Inventor: George L. Bees, Natick, Mass.

[73] Assignee: Candela Corporation, Natick, Mass.

[21] Appl. No.: 567,618

[22] Filed: Jan. 3, 1984

Related U.S. Application Data

[63] Continuation of Ser. No. 444,209, Nov. 24, 1982, abandoned, which is a continuation of Ser. No. 206,389, Nov. 13, 1980, Pat. No. 4,366,570.

[51] Int. Cl.³ .......................................... H02M 7/515
[52] U.S. Cl. .................................. 315/241 R; 320/1; 363/58; 363/96
[58] Field of Search ................ 315/241 R; 320/1; 331/113 S, 114; 363/27, 37, 57, 58, 96, 139; 372/70, 82

[56] References Cited

U.S. PATENT DOCUMENTS

| | | | |
|---|---|---|---|
| 3,541,420 | 11/1970 | Rees | 320/1 |
| 3,541,421 | 11/1970 | Buchman | 320/1 |
| 3,852,656 | 12/1974 | Bourbeau | 363/58 |
| 3,860,864 | 1/1975 | Fitz | 320/1 X |
| 4,078,247 | 3/1978 | Albrecht | 363/96 |
| 4,107,771 | 8/1978 | Anderson et al. | 363/58 |
| 4,112,286 | 9/1978 | Alderman et al. | 363/57 |
| 4,129,809 | 12/1978 | Rosa | 363/161 X |
| 4,180,853 | 12/1979 | Scorso, Jr. et al. | 363/96 |
| 4,197,575 | 4/1980 | Young | 363/96 X |
| 4,204,268 | 5/1980 | Vivirito | 363/96 X |

OTHER PUBLICATIONS

Cronin, 2800 *Watt Series Inverter DC Power Supply*, PCSC 1971 Record, pp. 117–123.
Schwarz, *A Series Capacitor Inverter-Converter for Multikilowatt Power Conversion*, NASA Technical Report R-336, Apr. 1970.
RCA Application Note AN-6456, "Characteristics and Applications of RCA Fast-Switching ASCR's", 1976.
RCA Application Note AN-6783, "ASCR's in Welding-Equipment Inverters", 1979.
RCA Application Note AN-6628, "Design and Applications of High-Power Ultrasonic Converters Using ASCR's", 1978.
Fitz, P. J. and T. H. Robinson, "A Thyristor Switched High Frequency Inverter for Directly Charging a Line Type Modulator", Marconi Research Laboratories, Chelmsford, U.K., pp. 110–117.
"Flashlamp Power Supply System", Model FS-1500, Bulletin 2763 of ILC Technology, 164 Commercial Street, Sunnyvale, CA 94087.
"Pulse Charging Power Supply Module", ILC Specification 0159, Apr. 1, 1970.
ILC Technology Circuit Diagram, "Pulse Charging Power Supply", Drawing No. 50610.

Primary Examiner—David K. Moore
Assistant Examiner—Vincent DeLuca
Attorney, Agent, or Firm—Hamilton, Brook, Smith & Reynolds

[57] ABSTRACT

A series inverter, high voltage capacitor charging circuit includes current sensors for sensing the current through each SCR in the circuit. The sensed current is used to vary the gating frequency of the SCRs and to preclude firing of an SCR until the other is in a stable off condition. The gating of each SCR is delayed by an amount of time determined by a control capacitor charging circuit. That charging circuit is inhibited as long as one of the SCRs is conducting and once the load voltage has reached a predetermined level. The time constant of that charging circuit can be changed as the desired level is approached.

11 Claims, 4 Drawing Figures

A TRANSFORMER CURRENT

B SENSED CURRENT

C CONTROL CAPACITOR VOLTAGE

D GATING CLOCK PULSES

SERIES INVERTER FOR CAPACITOR CHARGING

This application is a continuation of application Ser. No. 444,209, filed Nov. 24, 1982, now abandoned, which is a continuation of Ser. No. 206,389, filed Nov. 13, 1980, now U.S. Pat. No. 4,366,570 issued Dec. 28, 1982.

DESCRIPTION

1. Technical Field

This invention relates to a control circuit for a series inverter. It has particular application to such converters used for charging high voltage capacitors such as those used to fire lasers.

2. Background

Lasers such as described in the U.S. Pat. No. 3,659,225 to Furumoto et al. use a high power flash to drive the laser. The near instantaneous, high voltage electrical input to such a flash lamp is provided by charging a large capacitor from line voltage to 15–25 kilovolts (kV). To fire the laser, the large capacitor is discharged into the flash lamp.

To provide the high voltage of 15–25 kV from a 110 V line voltage, a step up transformer is conventionally used. A transformer which could operate from line voltage and frequency would be unsuitably large. Thus, past charging supplies have first converted the ac line voltage to a dc voltage. The dc voltage is applied to a series inverter which generates an ac input to the charging transformer at a high frequency in the order of several kilohertz (kHz).

In a preferred series inverter charging circuit, two silicon controlled rectifiers (SCR) are connected across the dc power supply to drive the primary of the charging transformer in a push-pull configuration. To provide maximum efficiency the SCR gating frequency should be very close to but less than the resonant frequency of the charging circuit. In that way, reflective power returned through the transformer to the SCRs acts to positively turn one SCR off and also to reenforce the current drawn through the transformer by the other SCR. Early SCR series inverter circuits used a fixed gating frequency throughout the charging period. This frequency could not be optimum throughout the charging because, in capacitor charging, the load impedance varies from zero to infinity. With that change in impedance the resonant frequency changes continually, and at best any fixed frequency is a compromise.

Power supplies have been made more efficient by varying the switching frequency to match the load. With feedback responding to the charge level of the charged capacitor, the gating frequency of the SCRs can be made to closely match the resonant frequency of the charging circuit.

A more serious problem with series inverter switching supplies is that, if the gating frequency is not a predetermined amount less than the resonant frequency of the circuit, one SCR may be turned on before the other has stabilized in the off condition. The result is simultaneous conduction by the two SCRs and a short across the dc power supply. Because the switches are operated near the upper limits of their current handling capabilities, such a short circuit is likely to result in destruction of the SCRs. To minimize this problem, some series inverter circuits include circuits which sense this shorted condition and shut the inverter down. In an attempt to avoid such simultaneous conduction, the circuits are designed, based on the LC time constant of the circuit, to delay gating of each SCR for a predetermined time after the expected zero crossing of the ac charging current.

A primary object of this invention is to provide a series inverter circuit suitable for high voltage capacitor applications which is not subject to commutation failure, that is simultaneous conduction of the electronic switches. A further object of this invention is to provide a variable frequency gating circuit which provides a close match between the gating frequency and resonant frequency of the circuit throughout the charging period.

DISCLOSURE OF THE INVENTION

In a series inverter control circuit having electronic switches connected in a push pull configuration to an LC load, sensors are provided for sensing the condition of each of the electronic switches. Those sensors provide feedback to a control circuit which gates each electronic switch only after the other has settled to a stable off condition.

In the preferred embodiment, the switches are SCR's and the cathode current of each SCR is sensed. Each SCR is gated on a predetermined time after the current in the other SCR has dropped to zero. As the time period during which each SCR conducts decreases, the gating period also decreases. In that way, the gating frequency closely matches the resonant frequency of the circuit while never equally or exceeding that frequency.

In a particular embodiment, a control capacitor charging circuit is inhibited for so long as current through either SCR is sensed. Once that current drops to zero, the control capacitor charges to a level which gates the other SCR on. The control capacitor charging time is sufficient to allow each SCR to stabilize in the off condition before the other is turned on. The time constant of the control capacitor charging circuit is increased as the voltage of the load capacitor approaches a regulated voltage level. Further charging of the load capacitor is inhibited once its voltage has stabilized at the regulated level.

Other specifics of the circuitry include a three coil current transformer to sense the current through each of the two SCRs and a load latch up inhibit circuit which prevents recharging of the load capacitor for a sufficient time to permit the discharging switches to stabilize.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

PREFERRED EMBODIMENT OF THE INVENTION

Figure 1:
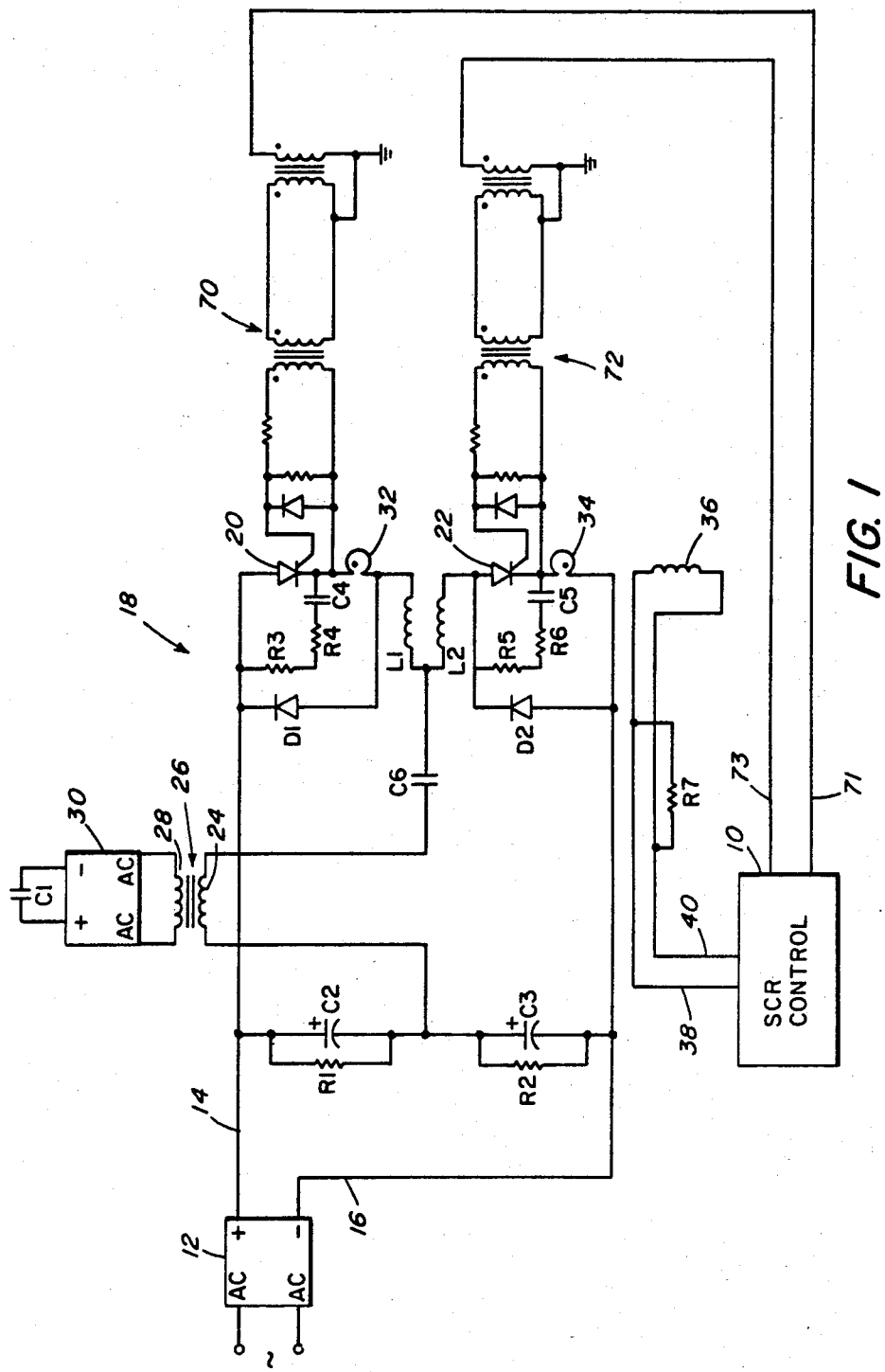
FIG. 1 is an electrical schematic diagram of a series inverter capacitor charging circuit embodying this invention.

FIG. 1 shows a capacitor charging series inverter circuit which is conventional except for the specifics of the SCR control and the feedback from the inverter to that control circuit 10. In this case, the inverter is used to charge a high voltage capacitive load shown simply here as a capacitor C1. That capacitor may, for example, be connected to a laser flash lamp firing circuit. Alternatively, the circuit may be used as a regulated high voltage dc power supply.

Line voltage is rectified by rectifier 12 to provide a dc power supply across lines 14 and 16. The dc supply is filtered by RC filter circuits R1,C2 and R2,C3.

An ac signal is applied to the primary 24 of a charging transformer 26 by alternately gating silicon controlled rectifiers 20 and 22. These SCRs are connected to the primary 24 in a push pull configuration. Diodes D1 and D2 are connected antiparallel to the SCRs to provide a return path for reflective current as will be discussed below. The series RC circuits, R3,R4,C4 and R5,R6,C5 provide for The series inverter circuit is completed by series inductors L1 and L2 and a series capacitor C6. These LC devices, in combination with the effective reactance seen at the primary of the transformer 26 determine the LC time constant of the circuit.

The very high frequency ac signal generated by the series inverter is stepped up to a high voltage such as 15-25 kV on the secondary 28 of the transformer. That high voltage ac signal is converted to a dc charging current by the rectifier 30. The capacitor C1 is charged a small amount, such as about 0.1 Joule (J) with each cycle of the inverter circuit. Operating at switching frequencies of about 6 KHZ to about 8 KHZ, the circuit is able to charge the capacitor C1 at a charging rate of over 1,000 J/second from 10 kV to 25 kV.

Figure 2:
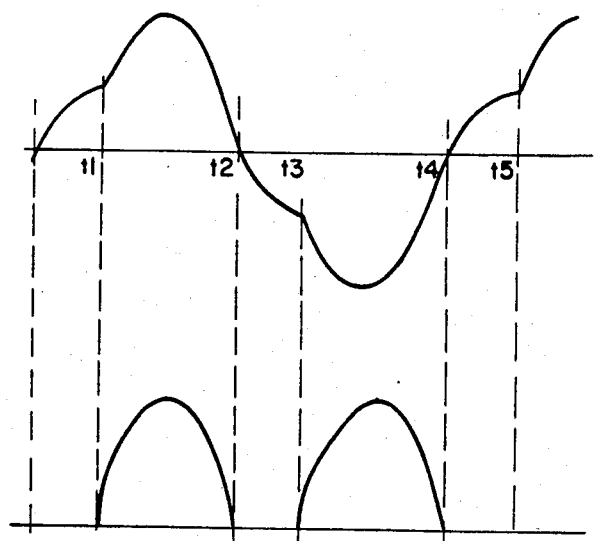
FIG. 2 is a timing chart for certain electrical signals in the series inverter circuit and its control.
Figure 2:
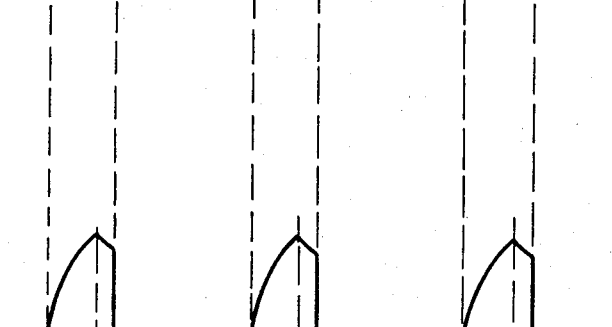
Figure 2:
Figure 2:
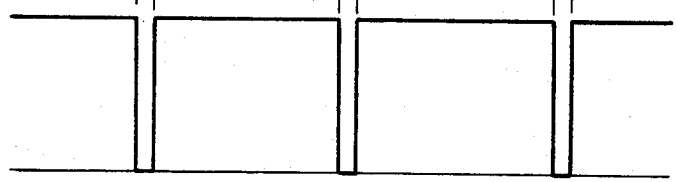

The preferred operation of any SCR controlled series inverter circuit can be best understood with reference to FIG. 2A. If the SCR 20 is switched on at time t1, current flows through that SCR, series inductor L1 and series capacitor C6 and through the transformer primary 24. Because the dc voltage is applied to an LC circuit, the current flow through the SCR will be approximately sinusoidal. Thus, the current through the SCR 20 and the transformer winding 24 drops to zero at the resonant frequency of the circuit. From the zero crossing time t2, reflective current flows back through the transformer winding 24 and the diode D1. At time t3, the SCR 22 is gated on to pull current through the transformer winding. The reflective current through diode D1 and the current drawn through SCR 22 re-enforce each other. This current is also sinusoidal and thus goes to zero at time t4 at which time the SCR 22 turns off. Reflective current continues through diode D2 until the SCR 20 is turned on at time t5, the beginning of another cycle.

It is important that each SCR not be gated on for some predetermined time after the other has turned off. If an SCR is not allowed to stabilize in the off condition, the SCR which next turns on can draw current through the first to switch it back on and create a short circuit between lines 14 and 16. The resultant high current would likely burn out the SCRs.

On the other hand, the turning on of the SCR should not be delayed any longer than necessary because the circuit operates most efficiently when the reflective current and SCR current re-enforce each other. Thus, each SCR should be gated at a frequency which is as close as possible to the resonant frequency of the circuit while still precluding the possibility of a commutation failure. The control of the SCRs is further complicated by the fact that the resonant frequency of the circuit increases as the load capacitor is charged. Thus, as the time period t1-t2 decreases with charging of the capacitor, the time t1-t3 must also decrease. Otherwise, the time t2-t3 would increase and the efficiency of the circuit would be reduced.

In accordance with this invention, the cathode current of each of the SCR's is sensed and fed back to the SCR control circuit 10. That feedback signal is used to preclude commutation failure and to vary the gating frequency of the SCRs. Specifically, the cathode currents are sensed by a three winding current transformer including primaries 32 and 34 and a current sensing secondary coil 36. The coil 36 is connected in parallel with a resistor R7. The current or winding 36 is positive if SCR 20 is conducting through the winding 32, and the current is negative if SCR 22 is conducting through winding 34.

Figure 3:
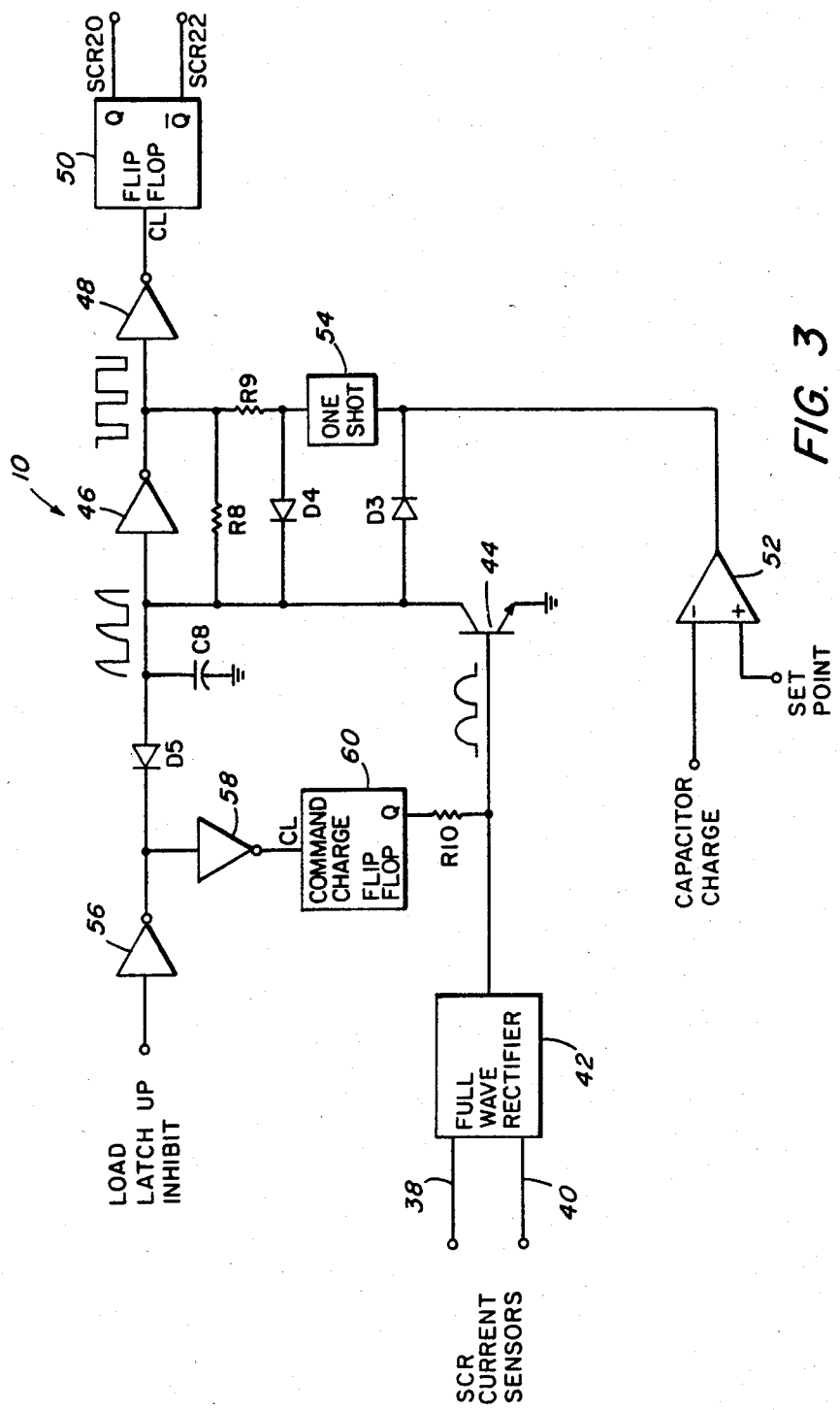
FIG. 3 is a simplified electrical schematic of the SCR control circuit of FIG. 1.

A simplified schematic of the SCR control circuit 10 is shown in FIG. 3. The sensing current on lines 38 and 40 from the winding 36 are applied through a full wave rectifier 42 to produce the sensed current signal of FIG. 2B. That signal drives the inhibit transistor 44. It is important that the current through the SCRs be distinguished from that through the diodes; otherwise the diode current would also cause transistor 44 to conduct. It is for that reason that the current sensing windings are placed between the SCR cathodes and the diode connections.

During the short periods in which neither SCR is conducting, and thus in which transistor 44 is turned off, a control capacitor C8 is charged as shown in FIG. 2C. When the capacitor C8 has charged to a level sufficient to trigger an inverting Schmitt trigger 46, a gating clock pulse (FIG. 2D) is sent through an inverter 48 to an SCR control flip flop 50. The gating of the SCRs 20 and 22 are controlled by the respective Q and $\overline{Q}$ outputs of that flip flop. Thus, triggering of the Schmitt trigger 46 after charging of the capacitor C8 initiates gating of whichever SCR was in the off condition during the previous half cycle. The charging time of the capacitor C8 is determined by the parallel resistors R8 and R9 connected to the output of the Schmitt trigger 46. Thus, the resistors R8 and R9 and the capacitor C8 are selected to provide a control capacitor charging time matching the time required for an SCR to stabilize after turning off.

As each SCR is turned on, a signal is applied through the current transformer in the full wave rectifier 42 to turn transistor 44 on. This discharges the capacitor C8 and inhibits further clocking of the flip flop 50 until the particular SCR turns off.

It should be recognized that the time between SCR gating pulses is determined directly by the turn on time of the SCRs. A short time interval required for each SCR to stabilize is added to that turn on time. Thus, as the turn on time decreases with charging of the load capacitor C1, the time between gating pulses also decreases. A single feedback circuit has both precluded simultaneous conducting by the SCRs and provided a varying frequency, load dependent, gate driving oscillator.

To regulate the voltage to which the load capacitor C1 is charged, the charge on that capacitor is detected through a voltage divider (not shown) to provide an input signal at the inverting input of a comparator 52. That input is compared to a set point voltage, and the output of the comparator goes low when the charge voltage matches the set point. With the output of comparator 52 low, the control capacitor C8 is discharged through diode D3. Further charging of the capacitor is inhibited for so long as the load charge is at the set point.

Noise can be expected to switch the comparator output before the charged voltage actually stabilizes at the desired regulated voltage. In order to slow the SCR gating and thus reduce the charging rate and noise, a one shot 54 is connected to increase the time constant of the control capacitor charging circuit when the comparator 52 detects the desired level, even if only noise is detected. When the noise is detected, the output of the one shot 54 goes low to turn the diode D4 off and disconnect resistor R9 from the control capacitor charging circuit. The one shot assures that this increased time constant prevails for a period of time even after the noise has subsided and the capacitor C8 is allowed to recharge.

As noted, once the voltage across the load capacitor C1 has stabilized at a level determined by the set point input to comparator 52, the charging circuit is inhibited and the regulated voltage is held on the capacitor C1. If that capacitor is in a laser firing circuit it may be discharged almost instantaneously through a power switch to the laser flash lamp. Once the capacitor has discharged, it is important that it not be recharged until the power switch is stabilized in the off condition. To prevent immediate recharging, a load latch up inhibit input is provided in the circuit of FIG. 3. When the load capacitor is discharged, a signal can be provided to the input of inverter 56 which discharges the capacitor C8. That input also clocks a command charge flip flop 60 through another inverter 58. The output of the flip flop then goes high to turn on the transistor 44 until the flip flop is again clocked. Thus, the gating of the SCRs 20 and 22 is inhibited until a second signal is applied to the inverter 56 to switch the Q output of flip flop 60 low.

Figure 4:
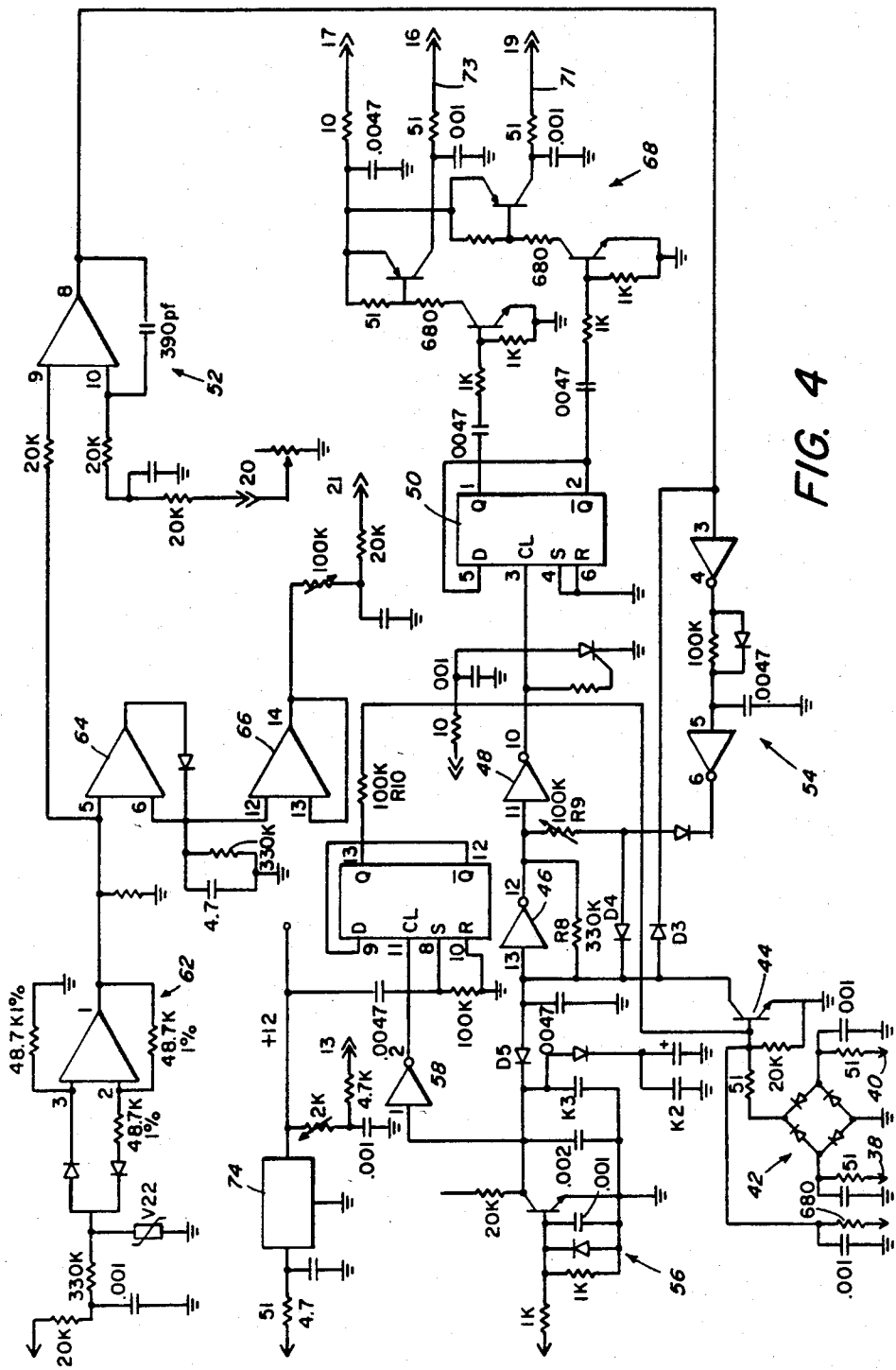
FIG. 4 is a detailed electrical schematic of the control circuit of FIG. 3.

A detailed schematic of the control circuit of FIG. 3 is shown in FIG. 4. Circuitry not indicated in FIG. 3 includes the full wave recitifier 62 which receives the voltage divided signal from the load capacitor and applies the resultant signal to the comparator 52. That signal is also input to a peak detector 64 which drives an external meter through a buffer amplifier 66. A voltage regulator 74 provides a 12 volt reference. Further, amplifiers 68 are provided at the output of the flip flop 50 to drive the SCR gates. As shown in FIG. 1, the gates are also driven through isolation transformer circuits 70 and 72.

With the high voltage section of a laser firing circuit, including the charging transformer 26 immersed in oil for heat dissipation, capacitor charging using the described circuit can be performed at very high repetition rates approaching that of the oscillator.

While the invention has been particularly shown and described with reference to a preferred embodiment thereof, it will be understood by those silled in the art that various changes in form and details may be made therein without departing from the spirit and scope of the invention as defined by the appended claims.

I claim:

1. A series inverter load-capacitor charging circuit comprising electronic switches connected in a push pull configuration between opposite junctions of a dc supply and a capacitor charging transformer in a common load circuit, the charging circuit comprising:
   means for sensing electric current which passes through the common load circuit;
   gate control means responsive to the sensed electric current for directly gating each electronic switch "on" a predetermined time after current flow through the other switch has dropped to zero, that predetermined time being greater than the time required for the other switch to settle to a stable off condition, the gate control means including a control capacitor charging circuit which is inhibited when one of the switches is on and which charges to a level which triggers gating of the other switch after current through the one switch drops to zero, the time constant of the control capacitor charging circuit setting the time between turn off and turn on of respective switches.

2. A circuit as claimed in claim 1 wherein the load capacitor is in a laser firing circuit.

3. A circuit as claimed in claim 1 wherein the load capacitor is in a regulated power supply.

4. A circuit as claimed in claim 1 further comprising means for disabling the gate control means when the load capacitor voltage reaches said predetermined level.

5. A circuit as claimed in claim 1 wherein the control capacitor is charged through a feedback resistor across an inverting Schmitt trigger.

6. A circuit as claimed in claim 1 further comprising means for changing the time constant of the control capacitor charging circuit as a load voltage approaches a predetermined level.

7. A circuit as claimed in claim 1 wherein the electronic switches are silicon controlled rectifiers.

8. A laser firing circuit having a series inverter, high voltage capacitor charging circuit comprising electronic switches connected between a dc supply and a reactance load characterized by:
   means for sensing at least one electrical parameter of the series inverter circuit the timing of which provides a direct indication of the resonant frequency of the circuit and of the timing of current flow through the electronic switches;
   gate control means responsive to the sensed electrical parameter for gating each electronic switch only after the other has settled to a stable off condition and for varying the gating frequency to closely follow the resonant frequency of the charging circuit as the resonant frequency varies with the charge on the capacitor; and
   means for disabling charging of the charged capacitor by the series inverter when the charged capacitor voltage reaches a predetermined level.

9. A circuit as claimed in claim 8 wherein the electronic switches are silicon controlled rectifiers.

10. A circuit as claimed in claim 9 wherein the electrical parameters are the electric currents through the silicon controlled rectifiers.

11. A capacitor charging circuit comprising:
   a power source;

a series inverter including silicon controlled rectifiers in series across the power source and an output transformer in a common load circuit connected between the silicon controlled rectifiers;

a diode connected antiparallel with each silicon controlled rectifier to form a parallel diode circuit;

a current sensor in each silicon controlled rectifier circuit for sensing current through the silicon controlled rectifier but not current through the parallel diode circuit, said current sensors providing control signals independent of current through the parallel diode circuits for operating said silicon controlled rectifiers to preclude commutation failure.

* * * * *